United States Patent [19]

Gaku et al.

[11] Patent Number: 4,469,859

[45] Date of Patent: Sep. 4, 1984

[54] CURABLE RESIN COMPOSITION COMPRISING CYANATE ESTER AND CYCLOPENTADIENE

[75] Inventors: Morio Gaku, Showamachi; Nobuyuki Ikeguchi, Tokyo, both of Japan

[73] Assignee: Mitsubishi Gas Chemical Company, Inc., Tokyo, Japan

[21] Appl. No.: 168,195

[22] Filed: Jul. 10, 1980

[30] Foreign Application Priority Data

Jul. 12, 1979 [JP] Japan .................................. 54-88620

[51] Int. Cl.³ ....................... C08G 83/00; C08G 73/10
[52] U.S. Cl. .................................. 528/159; 428/411.1; 428/473.5; 428/474.4; 428/521; 525/152; 525/186; 525/205; 525/422; 528/163; 528/170; 528/172; 528/203; 528/211; 528/322; 528/392; 528/422
[58] Field of Search ............... 528/392, 322, 422, 159, 528/163, 170, 172, 203, 211; 525/422, 152, 186, 205

[56] References Cited

U.S. PATENT DOCUMENTS 3,448,079  6/1969  Grigat et al. .......................... 260/59
3,553,244  1/1971  Grigat et al. ......................... 260/453
3,562,214  2/1971  Kubens et al. ......................... 260/47
3,740,348  6/1973  Grigat et al. ................. 260/453 AL
3,755,402  8/1973  Grigat et al. ................. 260/453 AR
4,110,364  8/1978  Gaku et al. .......................... 528/170
4,116,946  9/1978  Jakob et al. .......................... 528/172

FOREIGN PATENT DOCUMENTS 1060933  5/1965  United Kingdom .

Primary Examiner—Harold D. Anderson
Attorney, Agent, or Firm—Fleit, Jacobson & Cohn

[57] ABSTRACT

A curable resin composition comprising a mixture and/or a preliminary reaction product of (a) polyfunctional cyanate ester, prepolymer of the cyanate ester, or coprepolymer of the cyanate ester and an amine, and (b) cyclopentadiene or polycyclopentadiene and a curable resin composition comprising a mixture or a preliminary reaction product of above component (a), above component (b) and (c), a polyfunctional maleimide, prepolymer of the maleimide or coprepolymer of the maleimide and an amine are disclosed. Cured resin having excellent impact-resistance, adhesive power, heat-resistance and chemical-resistance can be prepared from the compositions.

8 Claims, No Drawings

CURABLE RESIN COMPOSITION COMPRISING CYANATE ESTER AND CYCLOPENTADIENE

BACKGROUND OF THE INVENTION

This invention relates to a curable resin composition comprising a mixture and/or a preliminary reaction product of (a) a polyfunctional cyanate ester, prepolymer of the cyanate ester or coprepolymer of the cyanate ester and an amine (sometimes hereunder referred to as component (a)), and (b) cyclopentadiene or polycyclopentadiene (sometimes hereinunder referred to as component (b)) and also relates to a curable resin composition comprising a mixture and/or a preliminary reaction product of (a) a polyfunctional cyanate ester, prepolymer of the cyanate ester or coprepolymer of the cyanate ester and an amine, (b) cyclopentadiene or polycyclopentadiene and (c) a polyfunctional maleimide, prepolymer of the maleimide or coprepolymer of the maleimide and an amine (sometimes hereinunder referred to as component (c)). Cured resin obtained by curing each of the resin compositions has excellent impact-resistance, adhesive, power, heat-resistance and chemical resistance.

In the prior art, the cured resin obtained by cast-molding a composition containing a polyfunctional maleimide and a polyfunctional cyanate ester has low impact resistance. Similarly, the cured resin obtained by cast-molding cyclopentadiene resin is fragile.

SUMMARY OF THE INVENTION

The present inventors carried out research for obtaining a cured resin having excellent impact resistance and excellent adherence to the substrate. As a result it was found that when a curable resin composition comprising a mixture and/or a preliminary reation product of (a) a polyfunctional cyanate ester, prepolymer of the cyanate ester or coprepolymer of the cyanate ester and an amine, and (b) cyclopentadiene or polycyclopentadiene, or a curable resin composition comprising a mixture and/or a preliminary reaction product of above component (a), above component (b) and (c) a polyfunctional maleimide, prepolymer of the maleimide or coprepolymer of the maleimide and an amine is cured, a cured resin having the above mentioned desirable properties can be obtained. This invention is based on these discovery.

DETAILED DESCRIPTION OF THE INVENTION

By polyfunctional cyanate ester is meant a compound having at least two cyanate groups in its molecule. The polyfunctional cyanate ester is represented by the formula $$R(-O-C\equiv N)_m$$

wherein R is an aromatic nucleus-containing residue which is selected from the group consisting of a residue derived from an aromatic hydrocarbon selected from the group consisting of benzene, biphenyl and naphthalene, a residue derived from a compound in which at least two benzene rings are bonded to each other by a bridging member selected from the group consisting of

wherein $R^1$ and $R^2$ are the same or different and each represents a hydrogen atom or an alkyl group containing 1 to 4 carbon atoms,

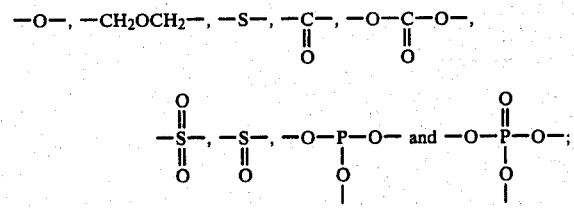

said aromatic nucleus is optionally substituted by a substituent selected from the group consisting of alkyl groups containing 1 to 4 carbon atoms, alkoxy groups containing 1 to 4 carbon atoms, chlorine and bromine; m is an integer of 2 to 10, and the cyanate group is always directly bonded to the aromatic nucleus.

Examples of the polyfunctional cyanate ester include dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane, 2,2-bis(3,5-dichloro-4-cyanatophenyl)propane, 2,2-bis-(3,5-dibromo-4-dicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak derived from novolak cyanated bisphenol type polycarbonate oligomer derived from bisphenol type polycarbonate oligomer and mixture thereof. Other cyanate ester employed in the practice of this invention are given in Japanese Patent Publication Nos. 1928/1966, 479/1969, 11712/1970 and 41112/1971 and Japanese Patent Publication (laid open) No. 63149/1976 which are incorporated herein for references. The above mentioned cyanate esters may be used as mixtures.

Prepolymers may be used containing a sym-triazine ring which is prepared by the trimerization of the cyanate groups of the cyanate ester, and which have an average molecular weight of at least 400 but no more than 6,000. Such prepolymers can be prepared by polymerizing the above cyanate esters in the presence of, as a catalyst, an acid such as a mineral acid or a Lewis acid, a base such as sodium hydroxide, a sodium alcoholate or a tertiary amine, or a salt such as sodium carbonate or lithium chloride.

The polyfunctional cyanate ester can be used in the form of a mixture of the monomer and the prepolymer. For example, many of the commercially available cyanate esters derived from bisphenol A and cyanogen halide are in the form of mixtures of cyanate monomers and prepolymers, and such materials can also be used in the present invention.

A coprepolymer of the cyanate ester and an amine may be used as the cyanate ester component. Examples of the amines include meta- or para-phenylenediamine, meta- or para-xylylenediamine, 1,4- or 1,3-cyclohexanediamine, hexahydroxylylenediamine, 4,4'- diaminobiphenyl, bis(4-aminophenyl)methane, bis(4-aminophenyl)ether, bis(4-aminophenyl)sulfone, bis(4-amino-3-methylphenyl)methane, bis(3-chloro-4-aminophenyl)methane, bis(4-amino-3,5-dimethylphenyl)methane, bis(4-aminophenyl)cyclohexane, 2,2-bis(4-aminophenyl)propane, 2,2-bis(4-amino-3-methylphenyl)propane, 2,2-bis(3,5-dibromo-4-aminophenyl)propane, bis(4-aminophenyl)phenylmethane, 3,4-diaminophenyl-4'-aminophenylmethane and 1,1-bis(4-aminophenyl)-1-phenylethane.

A mixture of prepolymer of the cyanate ester and coprepolymer of the cyanate ester and an amine may be used as component (a) of this invention.

The cyclopentadiene employed as component (b) of this invention is a liquid having a boiling point of 41.5° C. The dimer of cyclopentadiene, namely dicyclopentadiene (melting point of 33.6° C.) is easily formed from cyclopentadiene at room temperature without any catalyst. The polymer thereof, namely polycyclopentadiene (dicyclopentadiene resin) is easily formed from cyclopentadiene or dicyclopentadiene at high temperature and under superpressure in the presence or absence of any catalyst. The cyclopentadiene component (b) employed in the practice of this invention includes cyclopentadiene monomer, cyclopentadiene dimer (dicyclopentadiene), polycyclopentadienes as prepared above or mixtures thereof.

The ratio of component (a) and component (b) is not critical. The ratio by weight of component (a) to component (b) may be in the range of from 99:1 to 1:99, preferably from 95:5 to 35:65. For example, when it is necessary for a cured resin to have heat resistance, more component (a) is used than component (b).

When component (c) is used with components (a) and (b), the heat resistance of the cured resin is further improved.

The polyfunctional maleimides employed in the present invention are organic compounds having two or more maleimide groups derived from maleic anhydride and a polyamine and are represented by the following general formula

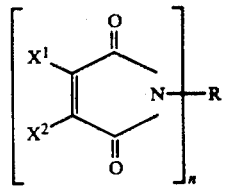

wherein R represents divalent to pentavalent aromatic or alicyclic organic group, each of $X^1$ and $X^2$ represent a hydrogen atom, halogen atom or alkyl group, and represent integer of 2–5.

The maleimides represented by the above formula can be produced by a method known per se which involves reacting maleic anhydride with polyamine to form a maleamide acid, and then dehydro-cyclizing the maleamide acid.

Aromatic amine are preferable as the starting polyamines. The reason is that the resulting object resin has excellent properties, such as heat-resistance, etc. When the resulting object resins have desirable flexibility and pliability, alicyclic amine alone or combination of the alicyclic amines and other amines may be used. Though secondary amines can be used as the starting amine, the primary amines are preferable.

Amines employed in reaction with cyanate esters for preparing coprepolymers of the cyanate ester and the amine may be profitably used as an amine component for preparing maleimides. In addition to the above mentioned amines, melamine having s-triazine ring and polyamines obtained by reaction aniline with formaldehyde, in which two or more benzene rings are bonded through methylene bond, may also be used.

The functional maleimides as mentioned above may be used alone or as a mixture. Also the prepolymer of the maleimide obtained by heating the maleimide in the presence or absence of a catalyst may be used. In addition, coprepolymers of the maleimide and the amine employed for synthesizing the polyfunctional maleimide may be used.

The curable composition of this invention may be prepared by merely mixing the above mentioned components (a) and (b) or components (a), (b) and (c) or by using the product of preliminary reaction of these components.

The curable composition of this invention comprises a mixture and/or a preliminary reaction product of (a) at least one compound selected from the group consisting of polyfunctional cyanate esters, prepolymers of the cyanates esters or coprepolymers of the cyanate esters and an amine and (b) at least one compound selected from the group consisting of cyclopentadiene, dicyclopentadiene and polycyclopentadiene (or cyclopentadiene resins) and optionally (c) at least one compound selected from the group consisting of polyfunctional maleimides, prepolymers of the maleimides and coprepolymers of the maleimides and an amine and/or (d) other component. The composition may be a mixture of components (a) and (b) and optionally (c) and/or (d); a preliminary reaction product of components (a) and (b), components (a), (b) and (c) or components (a), (b), (c) and (d); a mixture of preliminary reaction product of two or three of components (a), (b), (c) and (d) and the remainder thereof. Other components (d) include epoxy resins; (meth)acrylates, such as methacrylates, acrylates, methacrylic epoxy esters, acrylic epoxy esters, acrylic alkenyl esters, methacrylic alkenyl esters, its prepolymers; polyallyl compounds, such as diallyl phthalate, divinylbenzene, diallylbenzene, trialkenyl isocyanulates or its prepolymers; phenol resins; polyvinyl acetal resins; such as polyvinyl formal, polyvinyl acetal, or polyvinyl butyral; acrylic resins, silicone rsins, or alkyd resins having OH group or COOH group; and liquid or elastic rubbers, such as polybutadiene, butadiene-acrylonitrile copolymer, polychloroprene, butadiene-styrene copolymer, polyisoprene or natural rubbers.

The curable composition of this invention may be reticulated by heating it alone to form a cured resin having heat resistance. In general, a catalyst may be used in order to promote crosslinking reaction of the components in the composition.

Examples of the catalyst include imidazoles, such as 2-methylimidazole, 2-undecylimidazole, 2-heptadecyl imidazole, 2-phenylimidazole, 2-ethyl 4-methylimidazole, 1-benzyl-2-methylimidazole, 1-propyl-2-methylimidazole, 1-cyanoethyl-2-methylimidazole, 1-cyanoethyl-2-ethyl-4-methylimdazole, 1-cyanoethyl-2-undecylimidazole, 1-cyanoethyl-2-phenylimidazole, 1-guanaminoethyl-2-methylimidazole and addition product of an imidazole and trimellitic acid; tertiary amines, such as N,N-dimethyl benzylamine, N,N-dimethylaniline, N,N- dimethyltoluidine, N,N-dimethyl-p-anisidine, p-halogeno-N,N-dimethylaniline, 2-N-ethylanilino ethanol, tri-n-butylamine, pyridine, quinoline, N-methylmorpholine, triethanolamine, triethylenediamine, N,N,N'N'-tetramethylbutanediamine, N-methylpiperidine; phenols, such as phenol, cresol, xylenol, resorcine, and phloroglucin; organic metal salts, such as lead naphthenate, lead stearate, zinc naphthenate, zinc octylate, tin oleate, dibutyl tin maleate, manganese naphthenate, cobalt naphthenate, and acetyl acetone iron; and inorganic metal salts; such as stannic chloride, zinc chloride and aluminum chloride; peroxides, such as benzoly peroxide, lauroyl peroxide, octanoyl peroxide, acetyl peroxide, para-chlorobenzoyl peroxide and di-t-butyl diperphthalate, acid anhydrides, such as maleic anhydride, phthalic anhydride, lauric anhydride, pyromellitic anhydride, trimellitic anhydride, hexahydrophthalic anhydride, hexahydropyromellitic anhydride and hexahydrotrimellitic anhydride, azo compounds, such as azoisobutylonitrile, 2,2'-azobispropane, m,m'-azoxystyrene, hydrozones, and mixtures thereof.

In addition to the above mentioned catalysts, a curing agent for epoxy resin and a curing catalyst for epoxy resin may be used as a catalyst of this invention.

The amount of the catalyst employed may be less than 5% by weight of total composition.

A variety of additives may be added to the curable composition to impact specific properties provided that they do not impair the essential properties of the resulting resin. Examples of the additives include natural or synthetic resins, fibrous reinforcement, fillers, pigments, dyestuffs, thickening agents, lubricants, flame-retardants and the like.

The curable compositions of this invention are present in a wide range of forms from liquid to solid at room temperature, depending on the natures of the components constituting the composition, and the preliminary reaction conditions. Solid curable composition, liquid curable composition or solution of the composition in solvent may be used in response to the use purpose.

The curing conditions of the curable composition of this invention depend on proportion of components constituting the composition and the nature of the components employed. In general, the composition of this invention may be cured by heating it at a temperature within the range of 100°–250° C.

When the curable composition of this invention is used for preparing molding, laminate, adhesive-assembly, press means is preferably applied to the molding, laminate or adhesive-assembly in the heat curing step. In general, these products may be pressed at a superpressure of 10–500 Kg/cm$^2$.

The composition of this invention is rapidly curable and is cured even under mild conditions, so is especially suitable when quantity production and ease of workability are desired. The cured resin made from the composition not only has excellent adhesive force, bond strength, heat resistance, and electric properties, but also excellent in mechanical properties, such as impact resistance, chemical resistance, moisture resistance and the like. The composition of this invention has a variety of uses—as a coating materials for rust prevention, flame resistance, flame retardance and the like, as electrical insulating varnish; as adhesive; in laminates to be used for furnitures; building materials, sheathing materials, electrical insulating materials, and the like; and in a variety of moldings.

The present invention is further illustrated by the following non-limiting Examples and Comparative Examples. Percent and parts are by weight, unless otherwise specified.

EXAMPLE 1

200 Grs. (grams) of dicyclopentadiene resin having softening point of 100° C. was uniformly mixed with 400 grs. of prepolymer obtained by preliminarily reacting 1,4-dicyanatobenzene at 160° C. for 90 minutes. 0.5 Grs. of benzoyl peroxide, 0.3 grs. of zinc octylate and 0.2 grs. of triethylene diamine were added to the mixture and in addition 1700 grs. of wollastonite and 4 grs. of carbon black were added to the mixture. The resulting mixture was uniformly milled to form molding material. The molding material was molded at 50 Kg/cm$^2$ at 160° C. for 90 minutes. The resulting molded product was cured at 185° C. for 2 hours. The test results on the product are shown in Table 1.

COMPARATIVE EXAMPLE 1

0.5 Grs. of zinc octylate and 0.2 grs. of triethylene diamine were added to 600 grs. of 1,4-dicyanatobenzene prepolymer employed in Example 1. In addition, 1700 grs. of wollastonite and 4 grs. of carbon black were added to the mixture. The molded product was prepared from the mixture in the same way as in Example 1. The test results on the product are shown in Table 1.

TABLE 1

| | Example 1 | Comparative Example 1 |
|---|---|---|
| product has surface gloss | yes | no |
| product is adversely effected, when maintained at 120° C. at 2 atms. in steam for 24 hrs. | no | somewhat |

EXAMPLE 2

Into a 2 l stainless steel reactor equipped with agitator was charged 700 grs. of 2,2-bis(4-cyanatophenyl)propane obtained by reacting bisphenol A with chlorocyan. After it was heated to 150° C., 300 grs. of bis(4-maleimidophenyl)ether obtained by reacting maleic anhydride with 4,4'-diaminodiphenyl ether was added thereto. After the mixture was preliminarily reacted at 150° C. for 3 hours, 150 grs. of dicyclopentadiene resin (its softening point is 100° C.) was added to the reaction product, and the additional reaction was effected at 150° C. for 2 hours.

0.1 Grs. of zinc octylate and 0.1 gr of benzoyl peroxide as a catalyst were added to the reaction product. The mixture was poured into a casting mold, and was heated at 180° C. for 24 hours to obtain reddish brown, clear resin plate 0.5 cm thick. The test results on the plate are shown in Table 2.

COMPARATIVE EXAMPLE 2

Dicyclopentadiene resin (its softening point is 100° C.) is cured at 180° C. for 24 hours in the same way as in Example 2. The test results on the resulting plate are shown in Table 2.

COMPARATIVE EXAMPLE 3

The procedure of Example 2 was repeated except that dicyclopentadiene resin was not used. The test results on the resulting plate are shown in Table 2.

EXAMPLE 3

Into a 2 l stainless steel reactor equipped with agitator was charged 700 grs. of 2,2-bis(4-cyanatophenyl)propane obtained by reacting bisphenol A with chlorocyan. It was heated at 160° C. for 1 hour to obtain prepolymer. To the prepolymer were added 40 grs. of bis(4-maleimidophenyl)methane, 60 grs. of mixture of 4-maleimidophenyl-3,',4'-dimaleimidophenyl methane and 4-maleimidophenyl-b 2',4'-dimaleimidophenyl methane and 200 grs. of dicyclopentadiene resin (its softening point is 125° C.). The mixture was reacted at 150° C. for 1 hour. The reaction product was dissolved in a mixed solvent of dimethyl formamide and methyl ethyl ketone, and 0.5 grs. of zinc octylate, 0.4 grs. of triethylene diamine and 0.1 gr. of benzoyl peroxide were added to the solution. The solution was uniformly blended to form varnish. Glass cloth were impregnated with the varnish and were dried by heating to form B-staged prepreg.

Several prepreg sheets are stacked and sandwiched between two sheets of copper foil 35μ thick. The laminate was laminate-molded at 50 Kg/cm² at 180° C. for 2 hours to completey cure the resin in the glass cloth. The physical properties of the copper-clad laminate are shown in Table 2.

COMPARATIVE EXAMPLE 4

The copper-clad laminate was prepared as in Example 3 except that dicyclopentadiene is not used. The physical properties of the plate are shown in Table 2.

TABLE 2

| | Ex. 2 | Com. Ex. 2 | Com. Ex. 3 | Ex. 3 | Com. Ex. 4 |
|---|---|---|---|---|---|
| Impact strength* | O | X | X | — | — |
| Peel strength of cooper foil 35μ thick (Kg/cm) | — | — | — | 1.6 | 1.4 |
| Solder heat resistance at 300° C., 120 seconds** | — | — | — | O | O |
| Chemical resistance — Immersion in 10% HCl for 24 hours | | | no change | | |
| Immersion in 10% NaOH for 24 hours | | | no change | | |
| Immersion in methylene chloride for 24 hours | no change | changed to some extent | no change | changed to some extent | |

Test method
*Impact strength
Sperical iron weighing 55 grs. was dropped from height of 70 cm on resin laminate plate. Symbol "O" shows that the plate was not cracked, whereas symbol "X" shows that the plate was cracked.
**Solder heat resistance
Copper-clad laminate for test was cut into 25 × 25 mm. The cut laminate pieces were floated on melting solder at 300° C. for 120 seconds. Symbol "O" shows that the plate was not damaged, whereas symbol "X" shows that the plate was damaged.

EXAMPLE 4

900 Grs. of 1,4-dicyanatobenzene were preliminarily reacted with 50 grs. of bis(4-maleimidophenyl)sulfone at 150° C. for 120 minutes. To the resulting reaction product was added 50 grs. of dicyclopentadiene. The resulting mixture was dissolved in methyl ethyl ketone and m-xylene. 0.4 Grs. of zinc octylate, 0.3 grs. of triethylene diamine and 0.1 gr. of dicumyl peroxide as a catalyst were dissolved in the solution. Aromatic polyamide cloth were impregnated with the solution. The cloth were dried by heating them to form B-stage prepreg. Several prepreg sheets were stacked and sandwiched between two sheets of copper foil 35μ thick. The prepregs were pressmolded at 50 Kg/cm² for 150 minutes. The physical properties of the copper-clad plate are shown in Table 3.

EXAMPLE 5

Preliminary reaction of 700 grs. of 2,2-bis(4-cyanatophenyl)propane was reacted at 150° C. for 400 minutes. The preliminary reaction product and 300 grs. of bis(4-maleimidophenyl)ether were dissolved in N,N-dimethylformamide. To the mixture was added 1000 grs. of dicyclopentadiene resin (softening point: 100° C.) dissolved in m-xylene. 0.5 Grs. of zinc octylate, 0.3 grs. of triethylene diamine and 0.4 grs. of di-t-butylperoxide were added to the mixture as a catalyst. The glass cloth were impregnated with the solution. The cloth were dried by heating them to form B-stage prepreg. Ten prepreg sheets were stacked and sandwiched between two sheets of copper foil 35μ thick. The laminate was laminate-molded at 200° C. under 50 Kg/cm² for 150 minutes. The physical data of the resulting copper-clad laminate are shown in Table 3.

EXAMPLE 6

28 Grs. of bis(4-maleimidophenyl)ether was preliminarily reacted with 112 grs. of 2,2-bis(4-cyanatophenyl)propane at 150° C. for 150 minutes. The preliminary reaction product was dissolved in a mixed solvent of methyl ethyl ketone and N,N-dimethylformamide. To the mixture were added 60 grs. of epoxy resin epikote 100 Shell Oil Company) and 400 grs. of dicyclopentadiene dissolved in m-xylene. The mixture was uniformly blended with stirring. 0.06 Grs. of zinc octylate, 0.04 grs. of triethylene diamine, 0.2 grs. of azoisobutylonitrile and 3.0 grs. of di-t-butyl peroxybutane were added to the mixture as a catalyst. The mixture was stirred to form uniform mixture. Glass cloth were impregnated with the resulting solution. The cloth were dried to obtain B-staged prepreg. Ten prepreg sheets were stacked and sandwiched between two sheets of copper foil 35μ thick. The laminate was laminate-molded at 200° C. at 30 Kg/cm² for 150 minutes. The cured product was after-cured at 210° C. for 4 hours. The physical properties of the molded product are shown in Table 3.

EXAMPLE 7

15 Grs. of bis(4-maleimidophenyl)methane was preliminarily reacted with 35 grs. of 2,2-bis(4-cyanatophenyl)propane at 140° C. for 180 minutes. The preliminary reaction product was dissolved in a mixed solvent of methyl ethyl ketone and N,N-dimethylformamide. To the mixture were added 850 grs. of dicyclopentadiene resin (softening point: 150° C.) dissolved in m-xylene. The mixture was uniformly blended with stirring. 0.2 Grs. of zinc octylate, 0.2 grs. of triethylene diamine, 0.8 grs. of benzoyl peroxide and 5 grs. of di-t-butylperoxybutane were added to the mixture. Glass cloth was impregnated with the resulting solution. The cloth was dried to obtain B-staged prepreg. Laminate was prepared as in Example 5 except that the above prepreg was used. The test results are shown in Table 3.

TABLE 3

|  |  | Ex. 4 | Ex. 5 | Ex. 6 | Ex. 7 |
|---|---|---|---|---|---|
| Peel strength of copper foil with 35μ thick (Kg/cm) | | 1.8 | 1.5 | 1.4 | 1.0 |
| Solder heat resistance at 300° C. for 60 seconds | | | no change | | |
| Steam resistance (120° C., 2 atms. 24 hours) | | | no change | | |
| Dielectric constant (1 MHz) | | 4.1 | 4.0 | 4.0 | 3.8 |
| dielectric dissipation factor (1 MHz) | | 0.0021 | 0.0025 | 0.0029 | 0.0035 |
| Barcol hardness (GYZJ934-1) | 25° C. | 70 | 70 | 72 | 73 |
| | 100° C. | 65 | 64 | 70 | 70 |
| | 150° C. | 61 | 60 | 67 | 68 |
| | 200° C. | 50 | 53 | 63 | 65 |
| | 250° C. | 45 | 48 | 58 | 60 |
| Chemical resistance | Immersion in 10% HCl for 24 hours | | no change | | |
| | Immersion in 10% NaCl for 24 hours | | no change | | |
| | Immersion in methylene chloride for 24 hours | | no change | | |

What is claimed is:

1. A curable resin composition comprising:
  (a) at least one cyanate ester compound selected from the group consisting of:
    (1) a polyfunctional aromatic cyanate ester monomer having the formula:

R—O—C≡N)$_m$ wherein m is 2 to 5 and R is an aromatic organic group, the cyanate group being bonded to an aromatic ring of said aromatic organic group,
    (2) a homoprepolymer of one or more cyanate esters of (1), and
    (3) a coprepolymer of (1) and an amine; and
  (b) at least one compound selected from the group consisting of:
    (1) a cyclopentadiene,
    (2) a dicyclopentadiene, and
    (3) a polycyclopentadiene,
said composition including a mixture of components (a) and (b), a preliminary reaction product of components (a) and (b), or the combination of said mixture and said preliminary reaction product.

2. The composition as defined in claim 1 wherein the cyanate ester is selected from the group consisting of 1,3-,1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatoaphthalene; 4,4'-dicyanatobiphenyl; bis(4-cyanathophenyl)methane; 2,2-bis(4-cyanatophenyl)propane, 2,2-bis(3,5-dichloro-4-cyanatophenyl)propane, 2,2-bis(3-dibromo-4-dicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cynated novolak produced by reacting a novolak with cyanogen halide, cyanated bisphenol polycarbonate oligomer produced by reacting a bisphenol polycarbonate oligomer with cyanogen halide; and mixtures thereof.

3. The composition as defined in claim 1 wherein the component (b) is selected from the group consisting of cyclopentadiene monomer, cyclopentadiene dimer, dicyclopentadiene resin and mixtures thereof.

4. The composition as defined in claim 1 wherein the ratio by weight of component (a) to component (b) is in the range of from 99:1 to 1:99.

5. A curable resin composition comprising:
  (a) at least one cyanate ester compound selected from the group consisting of:
    (1) a polyfunctional aromatic cyanate ester monomer having the formula:

R—O—C≡N)$_m$ wherein m is 2 to 5 and R is an aromatic organic group, the cyanate groups being bonded to an aromatic ring of said aromatic organic group,
    (2) a homoprepolymer of one or more cyanate esters of (1), and
    (3) a coprepolymer of (1) and an amine;
  (b) at least one compound selected from the group consisting of:
    (1) a cyclopentadiene,
    (2) a dicyclopentadiene, and
    (3) a polycyclopentadiene,
  (c) at least one compound selected from the group consisting of:
    (1) a polyfunctional maleimide,
    (2) a homoprepolymer of one or more maleimides of (1), and
    (3) a coprepolymer of (1) and an amine,
said composition including a mixture of components (a), (b) and (c), a preliminary reaction product of components (a), (b) and (c), the combination of said mixture and said preliminary reaction product, the combination of (a) and the preliminary reaction product of (b) and (c), the combination of (b) and the preliminary reaction product of (a) and (c), or the combination of (c) and the preliminary reaction product of (a) and (b).

6. The composition as defined in claim 5 wherein the cyanate ester is selected from the group consisting of 1,3-, or 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane; 2,2-bis(3,5-dichloro-4-cyantophenyl)propane; 2,2-bis(3,5-dibromo-4-dicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak produced by reacting a novolak, with cyanogen halide; cyanated bisphenol polycarbonate oligomer produced by reacting a bisphenol polycarbonate oligomer with cyanogen halide; and mixtures thereof.

7. The composition as defined in claim 5 wherein the component (b) is selected from the group consisting of cyclopentadiene monomer, cyclopentadiene dimer, dicyclopentadiene resin and mixtures thereof.

8. The composition as defined in claim 5 wherein the ratio by weight of component (a) and component (b) is in the range from 99:1 to 1:99.

* * * * *